United States Patent

Sasaki

Patent Number: 6,076,252
Date of Patent: Jun. 20, 2000

[54] METHOD OF MANUFACTURING COMBINATION TYPE THIN FILM MAGNETIC HEAD

[75] Inventor: Yoshitaka Sasaki, Yokohama, Japan

[73] Assignee: TDK Corporation, Tokyo, Japan

[21] Appl. No.: 09/220,700

[22] Filed: Dec. 24, 1998

[30] Foreign Application Priority Data

Dec. 25, 1997 [JP] Japan .................................... 9-356779

[51] Int. Cl.[7] ...................................................... G11B 5/42
[52] U.S. Cl. ............................................................ 29/603.1
[58] Field of Search ............................. 29/603.1, 603.14, 29/603.15, 603.24, 603.25

[56] References Cited

U.S. PATENT DOCUMENTS 4,689,877  9/1987  Church .

FOREIGN PATENT DOCUMENTS 63-29315  2/1988  Japan .

*Primary Examiner*—Carl E. Hall
*Attorney, Agent, or Firm*—Oliff & Berridge, PLC

[57] ABSTRACT

A combination type thin film magnetic head including an inductive type writing thin film magnetic head and a magnetoresistive type reading thin film magnetic head successively stacked on a substrate is manufactured in the following manner. A metal or metal compound layer 14 serving as a mask for forming recessed portions 15 in a wafer surface is formed on the wafer surface, and at the same time electrode patterns P each including a plurality of electrode elements 31a–31f are formed from the same metal or metal compound material such that distances from a reference position of throat height zero to inner edges of respective electrode elements differ from each other. In the wafer surface, there are formed recessed portions 15 by the reactive ion etching while the metal or metal compound layer is used as a mask. After forming combination type thin film magnetic head units including inductive type thin film magnetic heads and magnetoresistive type thin film magnetic heads, the wager 11 is divided into bars B, in each of which the electrode patters P are formed at or near respective ends. A side surface 35 of the bar B is polished while conduction/cut-off condition of the electrode elements 31a–31f are monitored by a measuring circuit 36. The polishing is stopped when a predetermined electrode element 31c is opened. In this manner, the throat height and apex angle of the writing thin film magnetic head and the MR height of the reading thin film magnetic head can be formed accurately.

23 Claims, 14 Drawing Sheets

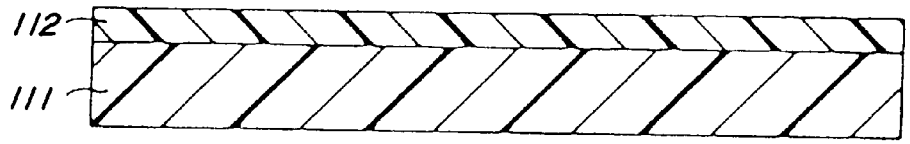
FIG_1 PRIOR ART
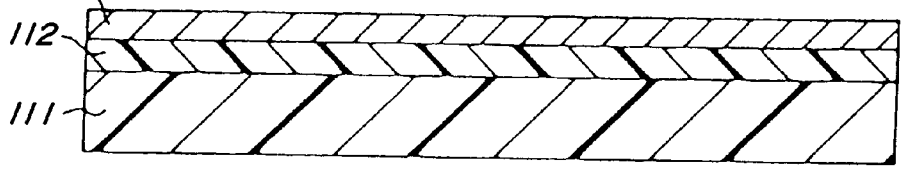
FIG_2 PRIOR ART
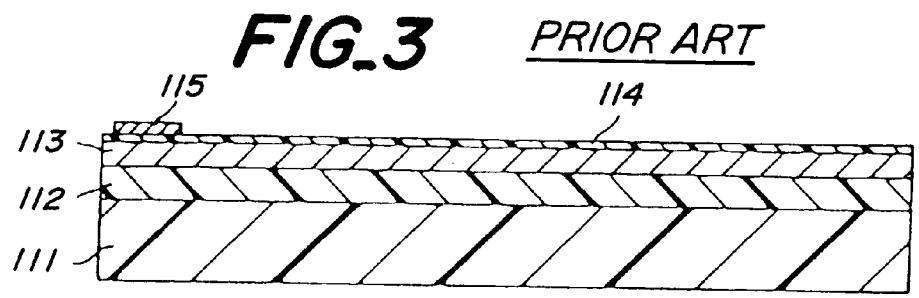
FIG_3 PRIOR ART
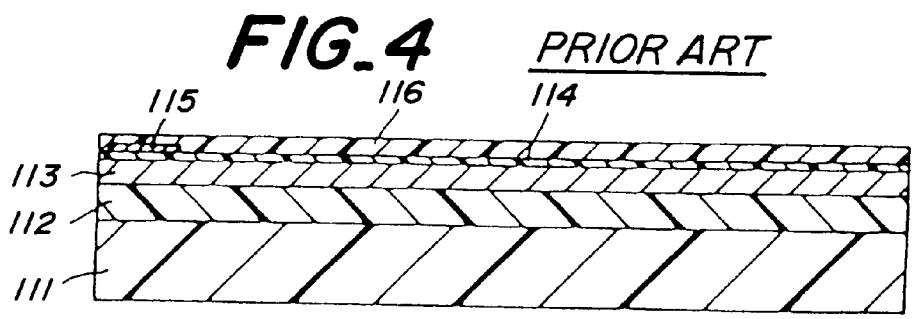
FIG_4 PRIOR ART
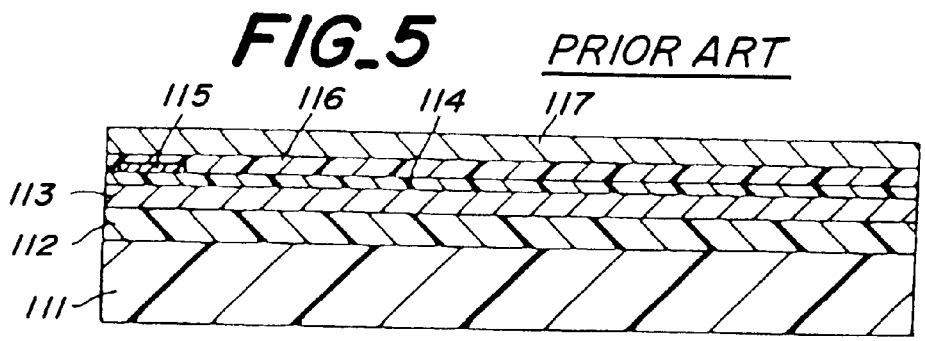
FIG_5 PRIOR ART

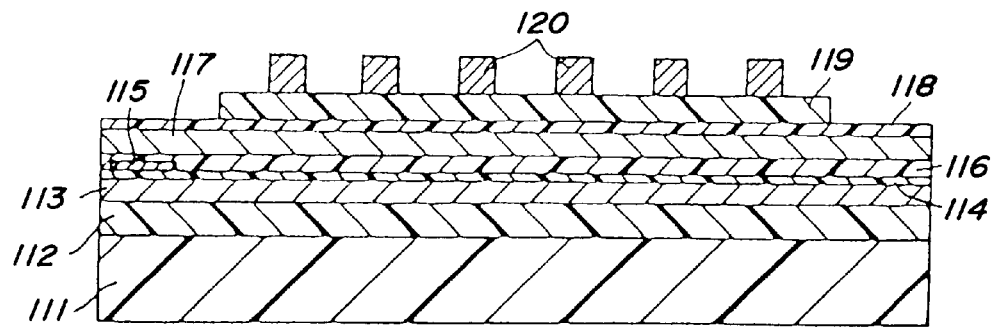
FIG_6    PRIOR ART
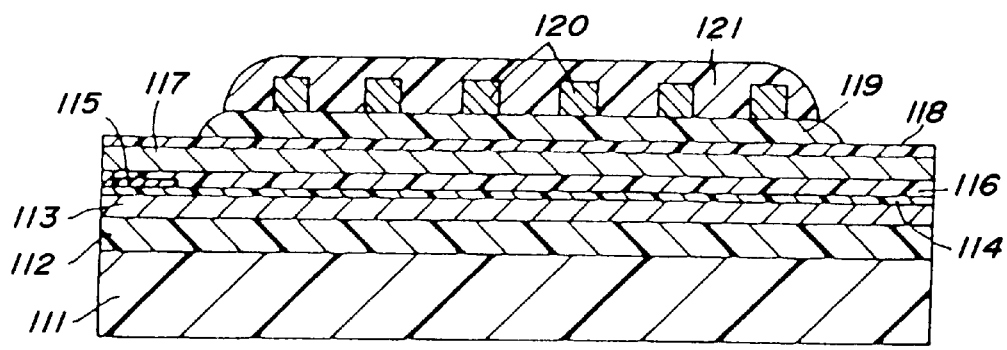
FIG_7    PRIOR ART
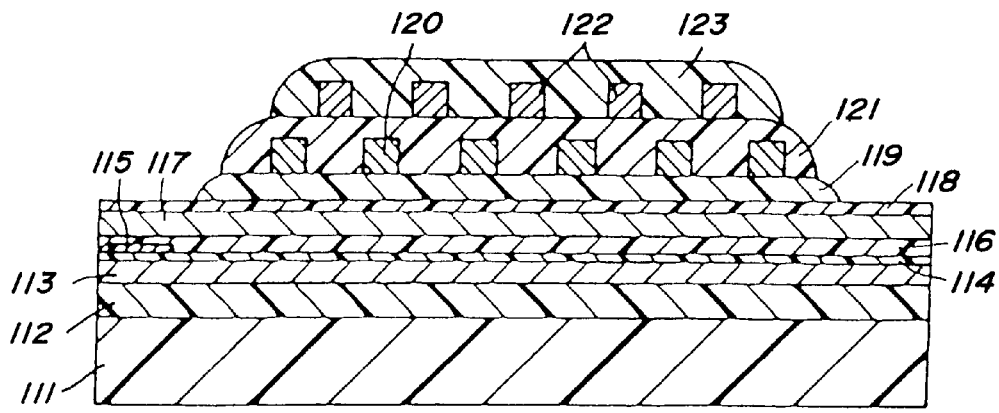
FIG_8    PRIOR ART

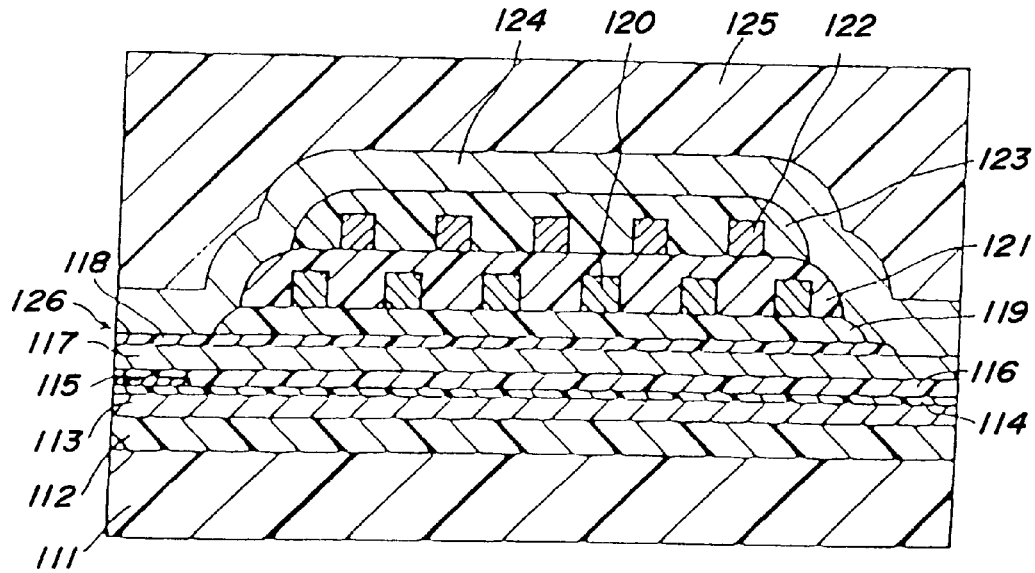
FIG_9
PRIOR ART
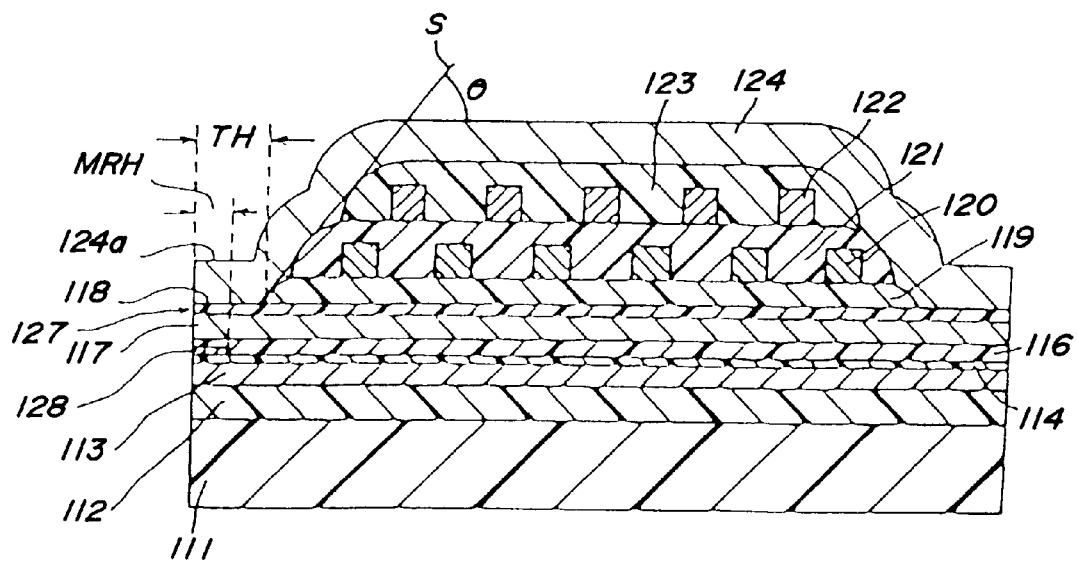
FIG_10
PRIOR ART

FIG_16
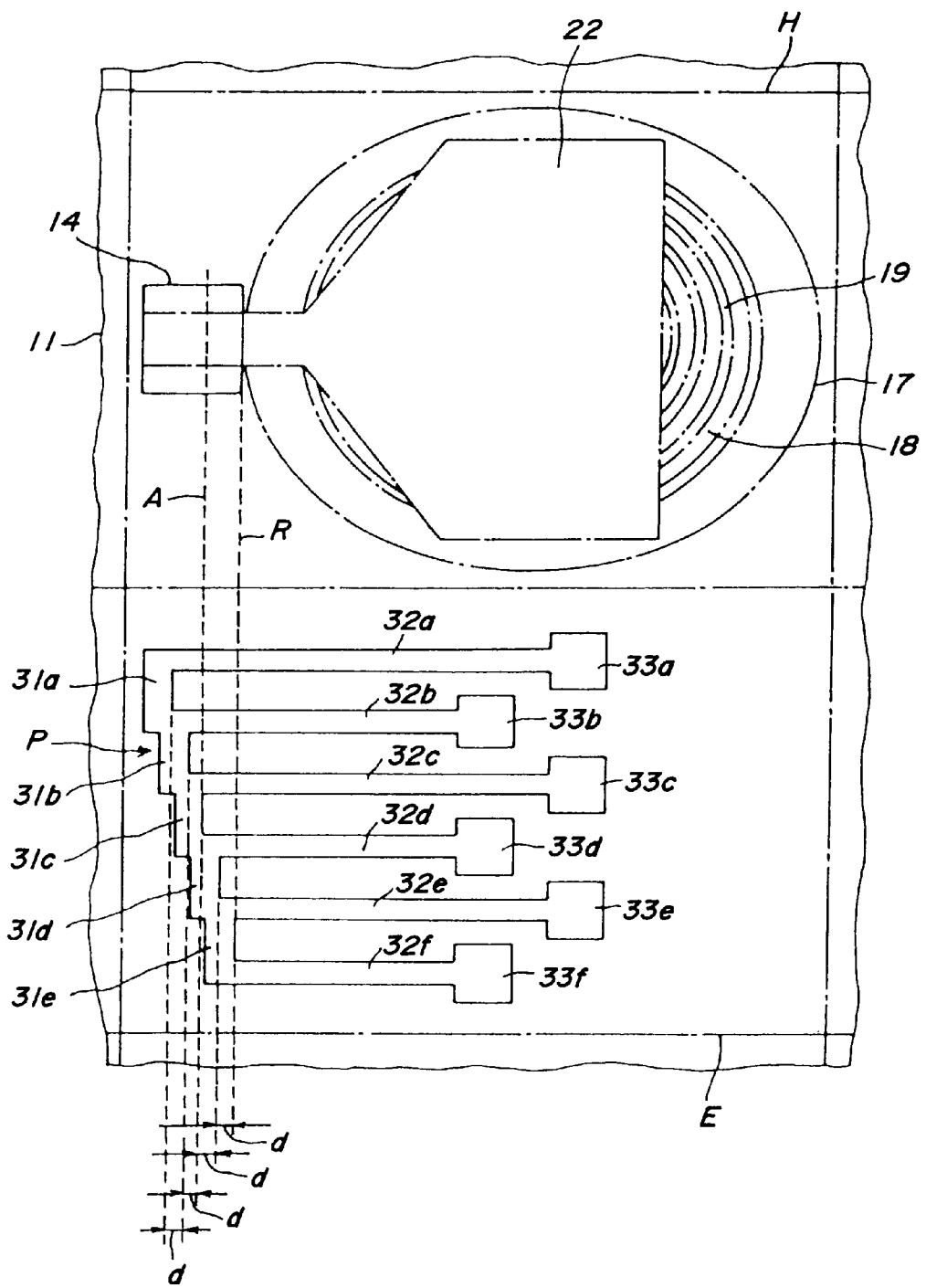

FIG_17
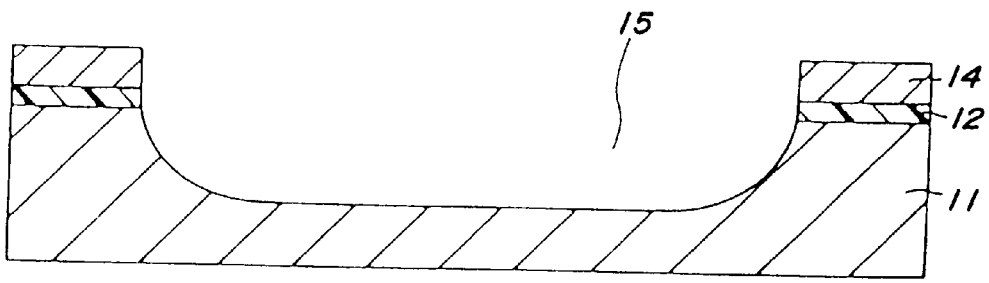
FIG_18
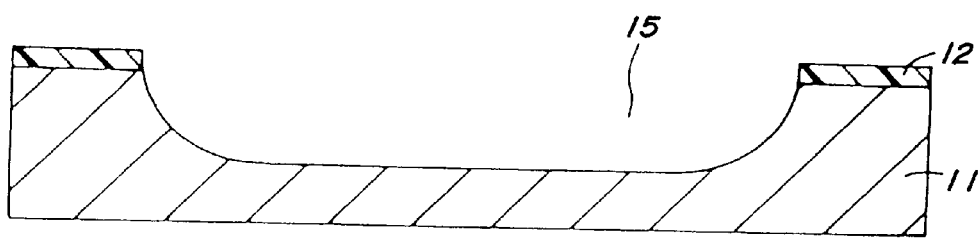
FIG_19
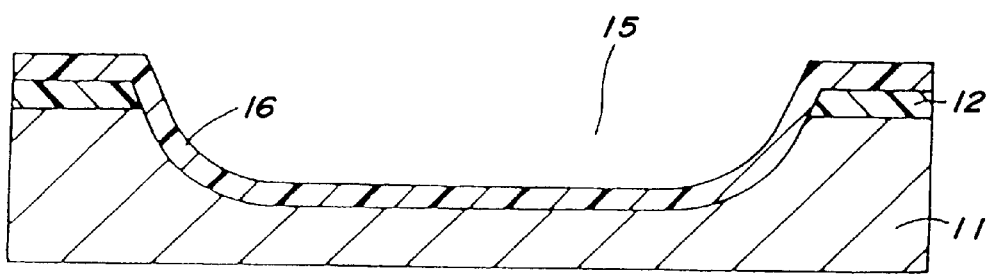

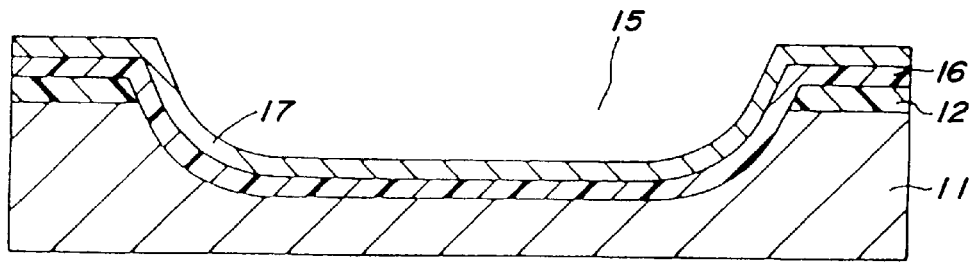
FIG_20
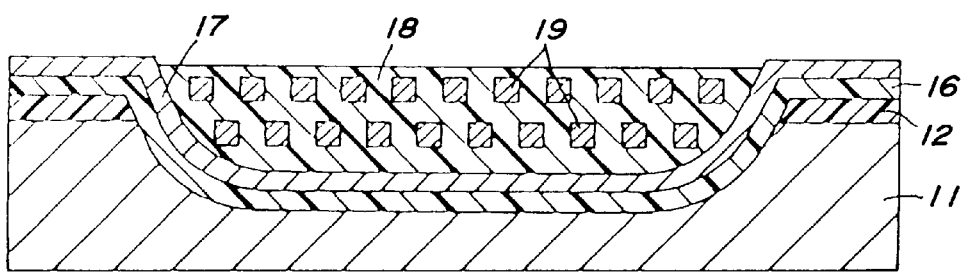
FIG_21
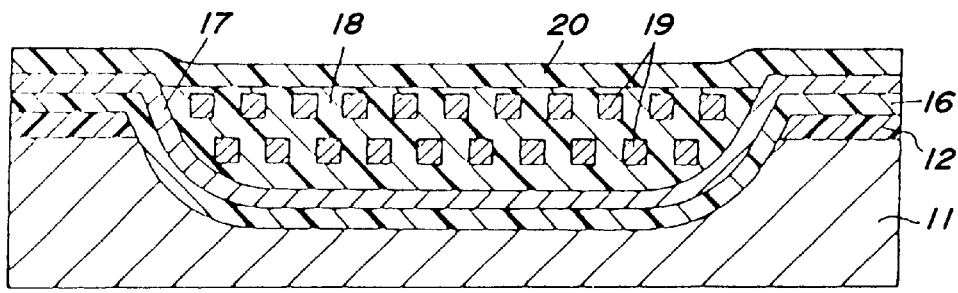
FIG_22

FIG._23
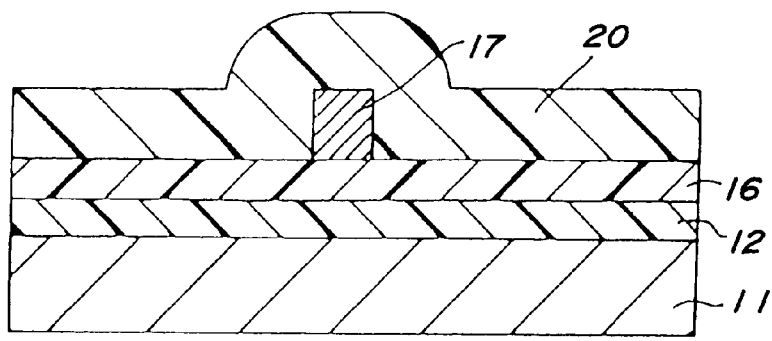
FIG._24
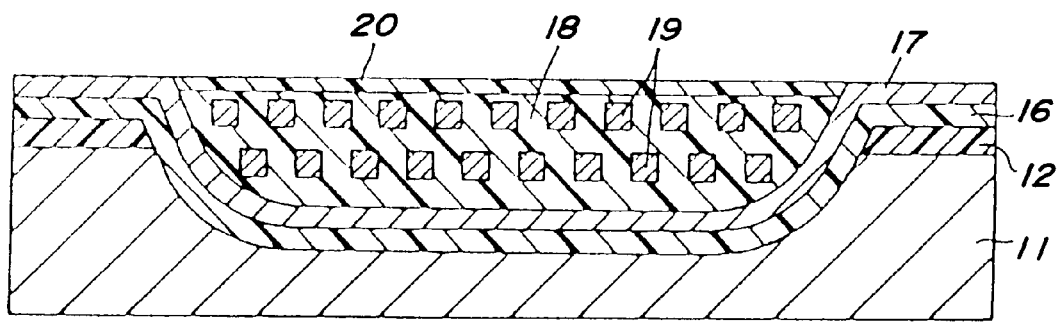
FIG._25
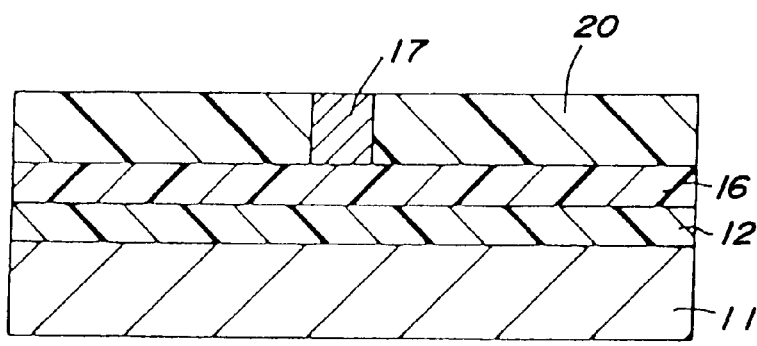

FIG._26
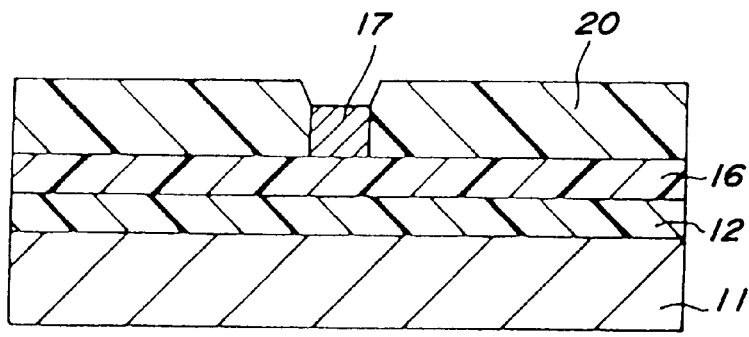
FIG._27
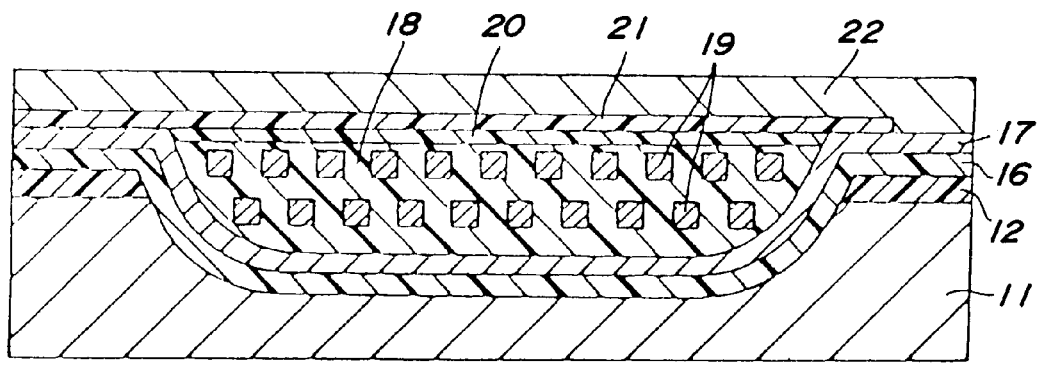
FIG._28
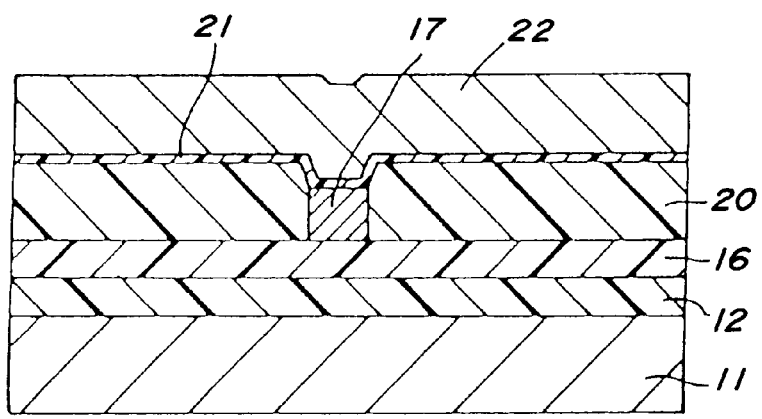

FIG_29
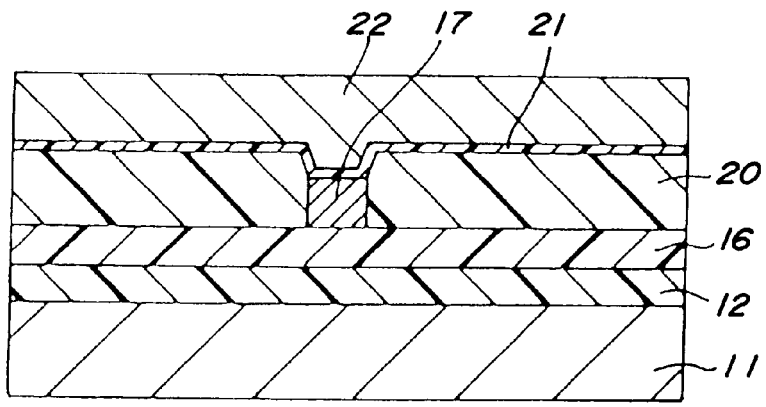
FIG_30
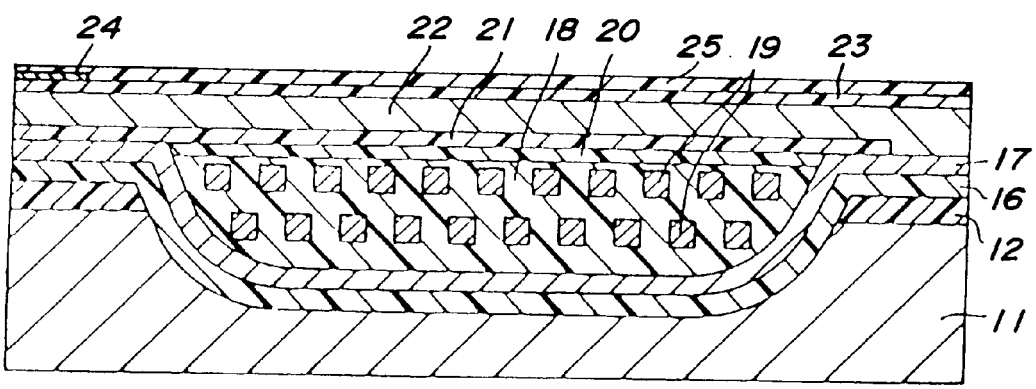
FIG_31
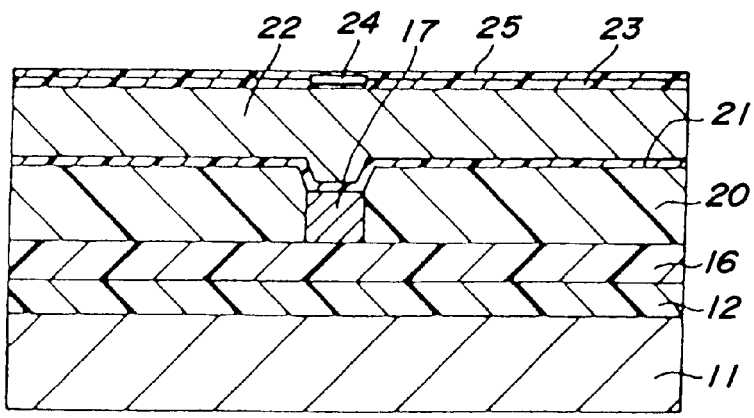

FIG_32
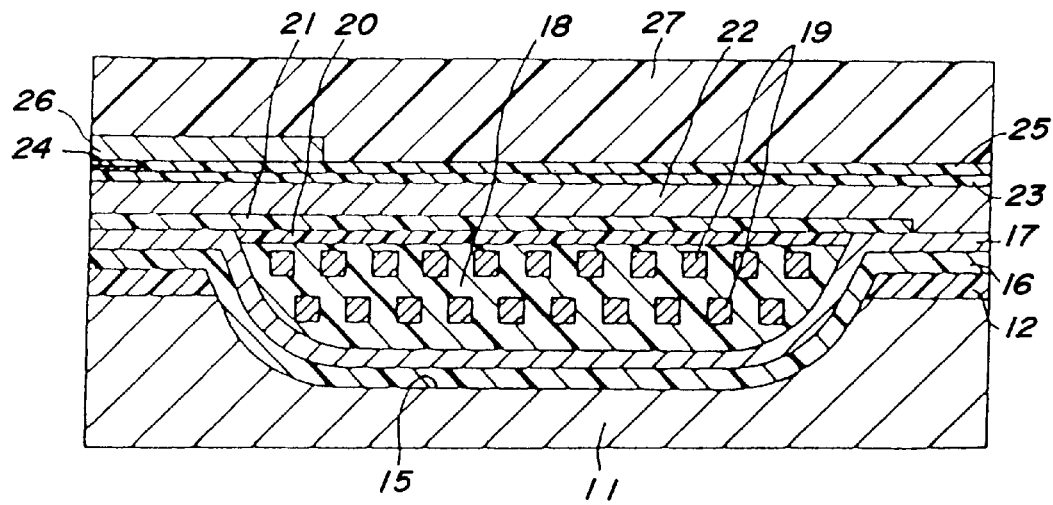
FIG_33
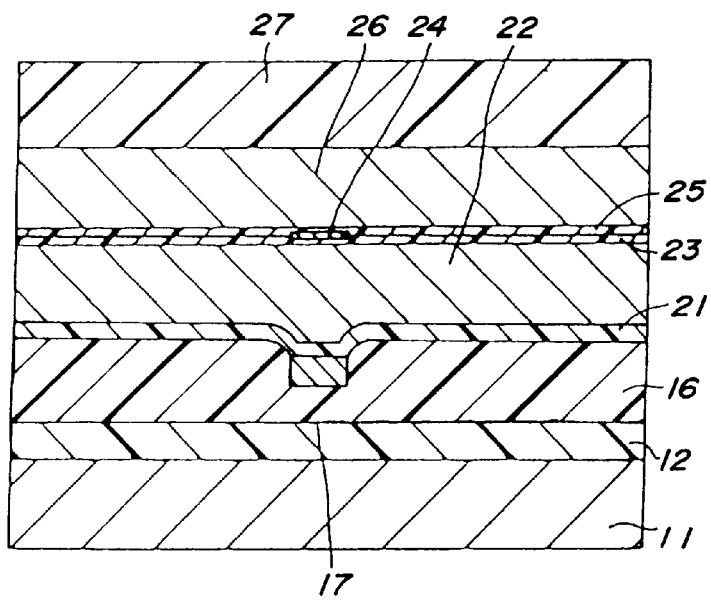

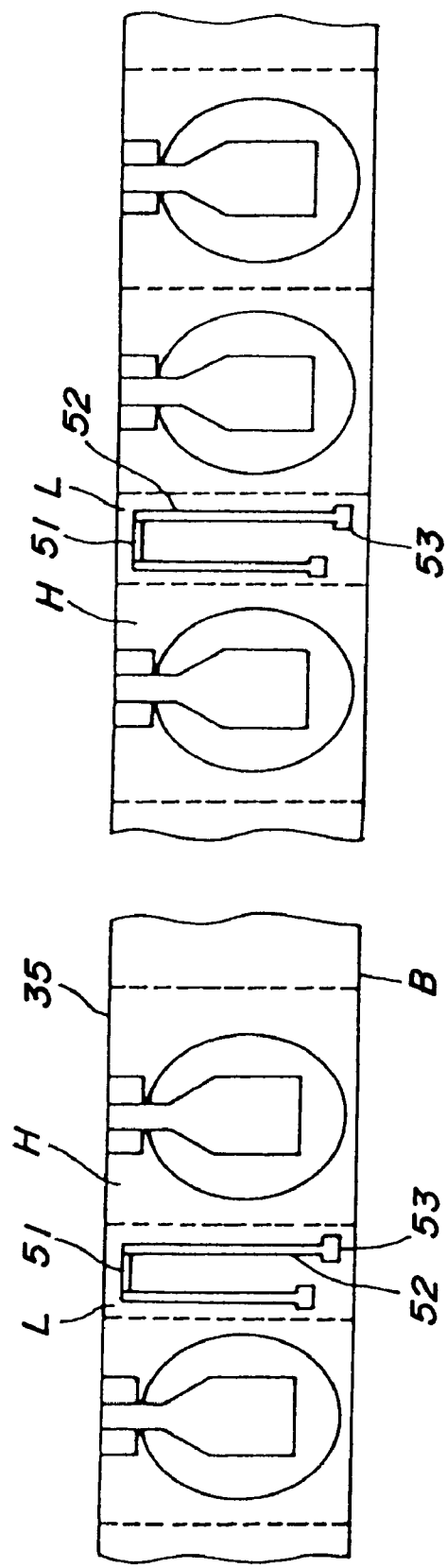

METHOD OF MANUFACTURING COMBINATION TYPE THIN FILM MAGNETIC HEAD

BACKGROUND OF THE INVENTION

1. Field of the Invention

The present invention relates to a method of manufacturing a thin film magnetic head, and more particularly to a method of manufacturing a combination type thin film magnetic head constructed by stacking an inductive type writing thin film magnetic head and a magnetoresistive type reading thin film magnetic head on a surface of a substrate in an electrically insulating and magnetically isolated manner.

2. Description of the Related Art

Recently a surface recording density of a hard disc device has been improved, and it has been required to develop a thin film magnetic head having an improved performance accordingly. A combination type thin film magnetic head is constructed by stacking an inductive type thin film magnetic head intended for writing and a magnetoresistive type thin film magnetic head intended for reading on a substrate, and has been practically used. In general, as a reading magnetoresistive element, an element utilizing anisotropic magnetoresistive (AMR) effect has been used so far, but there has been further developed a GMR reproducing element utilizing a giant magnetoresistive (GMR) effect having a resistance change ratio higher than that of the normal anisotropic magnetoresistive effect by several times.

In the present specification, elements exhibiting a magnetoresistive effect such as AMR and GMR reproducing elements are termed as a magnetoresistive reproducing element or MR reproducing element.

By using the AMR reproducing element, a very high surface recording density of several gigabits/inch$^2$ has been realized, and a surface recording density can be further increased by using the GMR element. By increasing a surface recording density in this manner, it is possible to realize a hard disc device which has a very large storage capacity of more than 10 gigabytes.

A height of a magnetoresistive reproducing element (MR Height: MRH) is one of factors which determine a performance of a reproducing head including a magnetoresistive reproducing element. The MR height MRH is a distance measured from an air bearing surface on which one edge of the magnetoresistive reproducing element is exposed to the other edge of the element remote from the air bearing surface. During a manufacturing process of the magnetic head, a desired MR height MRH can be obtained by controlling an amount of polishing the air bearing surface.

At the same time, the performance of the recording magnetic head is also required to be improved in accordance with the improvement of the performance of the reproducing magnetic head. In order to increase a surface recording density, it is necessary to make a track density on a magnetic record medium as high as possible. For this purpose, a width of a write gap at the air bearing surface has to be reduced to a value within a range from several micron meters to several sub-micron meters. In order to satisfy such a requirement, the semiconductor manufacturing process has been adopted for manufacturing the thin film magnetic head.

One of factors determining the performance of the inductive type writing thin film magnetic head is a throat height TH. This throat height TH is a distance of a pole portion measured from the air bearing surface to an edge of an insulating layer which serves to separate a thin film coil from the air bearing surface. It has been required to shorten this distance as small as possible. The reduction of this throat height is also decided by an amount of polishing the air bearing surface.

FIGS. 1–12 show successive steps of a method of manufacturing a conventional standard thin film magnetic head and a completed thin film magnetic head. It should be noted that the thin film magnetic head is of a combination type in which the inductive type thin film magnetic head for writing is stacked on the reproducing MR element.

First of all, as shown in FIG. 1, an alumina insulating layer 112 is deposited on a substance 111 made of, for instance AlTiC and having a thickness of about 5–10 μm.

Next, as shown in FIG. 2, a bottom shield magnetic layer 113 which protects the MR reproduction element of the reproducing head from the influence of an external magnetic field, is formed with a thickness of 3 μm. Then, as shown in FIG. 3, an insulating layer 114 of thickness 100–150 nm serving as a shield gap layer is formed by sputtering alumina. Furthermore, as illustrated in FIG. 3, a magnetoresistive layer 115 made of a material having the magnetoresistive effect and constituting the MR reproduction element is formed on the shield gap layer 114 with a thickness of several tens nano meters and is then shaped into a given pattern by the highly precise mask alignment.

Then, as shown in the FIG. 4, an alumina insulating layer 116 similar to the alumina insulating layer 114 is formed such that the magnetoresistive layer 115 is embedded within the insulating layers 114 and 116.

Next, as shown in the FIG. 5, a magnetic layer 117 made of a permalloy is formed with a thickness of 3–4 μm. This magnetic layer 117 has not only the function of the upper shield layer which magnetically shields the MR reproduction element together with the above described bottom shield layer 113, but also has the function of one of poles of the writing thin film magnetic head. Here, the magnetic layer 117 is called a first magnetic layer by taking into account the latter function.

Then, as depicted in FIG. 6, a write gap layer 118 made of a nonmagnetic material such as alumina and having a thickness of about 150–300 nm is formed on the first magnetic layer 117, and an electrically insulating layer 119 made of a photoresist is formed on the gap layer into a given pattern by the mask alignment of high precision. Further, a first layer thin film coil 120 made of, for instance a copper is formed on the photoresist layer 119.

Continuously, as shown in FIG. 7, after forming an electrically insulating photoresist layer 121 on the thin film coil 120 by the highly precise mask alignment, the photoresist layer is sintered at a temperature of, for example 250° C.

In addition, as shown in FIG. 8, a second layer thin film coil 122 is formed on the flattened surface of the photoresist layer 121. Next, after forming a photoresist layer 123 on the second layer thin film coil 122 with the highly precise mask alignment, the photoresist layer is flattened by performing the sintering process at a temperature of, for example 250° C.

As described above, the reason why the photoresist layers 119, 121 and 123 are formed by the highly precise mask alignment process, is that the throat height TH and MR height MRH are defined with reference to a position of the edges of the photoresist layers.

Next, as shown in FIG. 9, a second magnetic layer 124 made of, for example a permalloy and having a thickness of 3–4 μm is selectively formed on the gap layer and photoresist layers 119, 121 and 123 in accordance with a desired pattern.

This second magnetic layer 124 is coupled with the first magnetic layer 117 at a rear position remote from the magnetoresistive layer 115, and the thin film coil 120, 122 passes through a closed magnetic circuit composed of the first and second magnetic layers. The second magnetic layer 122 includes a pole portion having desired size and shape for defining a track width W.

Furthermore, an overcoat layer 17 made of alumina is deposited on the exposed surface of the gap layer 118 and second magnetic layer 124. In an actual thin film magnetic head, electric conductors and contact pads for performing the electrical connection to the thin film coils 120, 122 and MR reproduction element are formed, but they are not shown in the drawings.

In an actual manufacturing process, the above mentioned substrate 111 is formed by a wafer, and after forming a number of thin film magnetic head units in the wafer in matrix, the wafer is divided into a plurality of bars, in each of which a plurality of thin film magnetic head units are aligned, and finally the bar is divided into respective thin film magnetic heads.

That is to say, as shown in FIG. 10, a side surface 126 of the substrate 111 on which the magnetoresistive layer 115 is exposed is polished to form an air bearing surface 127 which is opposed to a magnetic record medium. During the formation of the air bearing surface 127, the magnetoresistive layer 115 is also polished to form a MR reproducing element 128, and at the same time the throat height TH and MR height MRH are determined.

When the air bearing surface is polished, it is difficult to perform the polishing while the throat height and MR height are actually monitored. Therefore, a resistance measuring circuit is connected to the conductive patters (not shown) connected to the magnetoresistive layer 115, a change in resistance which is reduced in accordance with a reduction of the height of the magnetoresistive layer due to the polishing is measured as a change in a current, and an amount of polishing is calculated from the variation in the thus measured current. That is to say, by performing the polishing operation until the resistance value of the MR reproducing element 128 becomes a predetermined value, desired throat height and MR height are attained.

FIGS. 10, 11 and 12 cross sectional, front and plan views, respectively showing the completed conventional thin film magnetic head, while the overcoat layer 125 is omitted. It should be noted that in FIG. 10, the alumina insulating layers 114 and 116 surrounding the MR reproducing element 128 are shown as a single insulating layer, and in FIG. 12, the thin film coil 120, 122 is shown concentrically for the sake of simplicity.

As clearly shown in FIG. 10, an angle θ (apex angle) between a line S connecting side edges of the photoresist layers 119, 121, 123 for isolating the thin film coil 120, 122 and the upper surface of the second magnetic layer 124 is an important factor for determining the performance of the thin film magnetic head together with the above described throat height TH and MR height MRH.

Furthermore, as shown in the plan view of FIG. 12, the width W of a pole portion 124a of the second magnetic layer 124 is small. Since the width of the track recorded on the magnetic record medium is defined by this width W, it is necessary to narrow this width as small as possible in order to achieve a high surface recording density.

In order to improve the surface recording density on the magnetic record medium, it is required to improve the performance of the recording head and reproducing head. In the above explained method of manufacturing the thin film magnetic head, a control in the order of sub-microns utilizing the semiconductor manufacturing technique is indispensable. The throat height and apex angle of the inductive type writing thin film magnetic head and the MR height of the reading thin film magnetic head including the MR reproducing element have a large influence upon the manufacturing yield of the combination type thin film magnetic head.

As explained above with reference to FIGS. 1–12, in the known method of manufacturing a thin film magnetic head, the MR height is determined by controlling an amount of polishing such that the measured resistance value of the magnetoresistive layer 115 of the MR reproducing element becomes a desired value. However, it is difficult to obtain the desired MR height by such a method, because there is not a definite or constant relationship between the resistance value of the magnetoresistive layer 115 and the MR height. That is to say, the resistance value of the magnetoresistive layer 115 fluctuates in accordance with its composition and manufacturing condition, and thus even if the resistance becomes a predetermined value, the MR height might not be a given value. Therefore, in the known method, although the MR reproducing element has a desired resistance value, the MR height might deviate from a desired value and the performance of the combination type thin film magnetic head might be decreased.

Moreover, even if the MR height becomes a desired value by polishing the air bearing surface by monitoring the resistance of the magnetoresistive layer 115, the throat height and apex angle of the writing thin film magnetic head could not always be identical with desired values. That is to say, upon manufacturing the writing thin film magnetic head, the reference position of throat height zero is defined by the edge of the insulating layer 119 and the apex angle is defined by the profile of the insulating layers 119, 121, 123, but these insulating layers are deformed by the heating treatment at about 250° C. during the formation of the thin film coil 120, 122, and the throat height zero position and the profile of the insulating layers might be changed. Particularly, when the photoresist insulating layers 119, 121, 123 have a large thickness, the deviation of the pattern might be large such as about 0.5 μm. Then, the fine throat height from several microns to sub-microns could not be realized in a reproductive manner and a desired apex angle could not be obtained. Further, when the thick insulating layers are used, the deviation of pattern might be increased due to unevenness of the film thickness.

For instance, in the high frequency thin film magnetic head, the throat height not larger than 1.0 μm is required, but due to the above explained large error up to 0.5 μm, the throat height might deviate from the desired value, and the manufacturing cost might be increased. Moreover, since an allowance for the apex angle is very small, the deviation in the apex angle due to the deformation of the profile of the insulating layers might exceed the allowance.

In order to mitigate the above mentioned drawbacks, in Japanese Patent Application Laid-open Publication Kokai Sho 63-29315 and corresponding U.S. Pat. No. 4,689,877, there is proposed a method, in which a plurality of switch contacts which are successively opened in accordance with the progress of polishing and guide resistors whose value is continuously changed in accordance with the progress of polishing are formed on both end portions of a bar in which a plurality of thin film magnetic head units are aligned, and the polishing is controlled by monitoring the opening of the switch contacts and resistance value such that the throat height becomes a desired value.

However, in this known method, additional manufacturing steps are required for forming the switch contacts and guide resistors at both ends of the bar, and thus a through-put is decreased to a large extent. That is to say, a step of forming the switch contacts from a conductive material and a step of forming the guide resistors from a resistive material are additionally or separately required. Moreover, since the plural switch contacts are formed such that distances between successive switch contacts are much longer than dimensions of electrode elements of the switch contacts viewed in the polishing direction, a fine control such as 0.1–0.5 µm could not be performed accurately even if the polishing is controlled by a combination of a stepwise change of the throat height measured by the opening or cut-off of the switch contacts and a continuous change of the throat height measured by the continuous resistance change of the guide resistance.

Furthermore, in case of controlling a polishing amount for the air bearing surface, the reference position of throat height zero should not be shifted largely. However, in the known method, since the insulating layers 119, 121, 123 are deformed largely due to the heating treatment as stated above, the throat height could not be controlled accurately. Further, in the known method, a deviation of the apex angle from a desired value could not be compensated for at all.

In order to improve the surface recording density on the record medium, it is also required to increase a sensitivity of the reading thin film magnetic head including the reproducing MR element. To this end, it is advantageous to utilize the GMR layer having a higher sensitivity. However, characteristics of the GMR layer are largely affected by heating. For instance, after forming the reproducing element having the GMR layer, when the insulating layers are heated, the characteristics of the GMR layer might be degraded extremely. The heating process is indispensable for flattening the thin film coil and improve the electrical isolation between coil windings.

SUMMERY OF THE INVENTION

It is an object of the present invention to provide a method of manufacturing a combination type thin film magnetic head, in which the throat height, apex angle and MR height can be controlled accurately and precisely, while the decrease in through-put can be avoided.

It is another object of the invention to provide a method of manufacturing a combination type thin film magnetic head in an accurate and easy manner, while the magnetic head includes the GMR layer which has a higher sensitivity, but is affected by heating.

According to the invention, a method of manufacturing a combination type thin film magnetic head in which an inductive type writing thin film magnetic head and a magnetoresistive type reading thin film magnetic head are stacked on a surface of a substrate in a magnetically and electrically isolating manner comprises:

the step of forming recessed portions in a surface of a wafer constituting the substrate by using a mask made of a metal or metal compound, and at the same time forming one or more electrode patterns each including a plurality of electrode elements made of said metal or metal compound such that distances from a reference position of throat height zero to inner edges of respective electrode elements differ from each other, said reference position extending in a direction parallel with air bearing surfaces of combination type thin film magnetic head units and being coincided with edges of the recessed portions;

the step of forming a first insulating layer on the surface of the wafer including inner surfaces of the recessed portions;

the step of forming combination type thin film magnetic head units each including a writing thin film magnetic head and a reading thin film magnetic head on the wafer such that at least a part of a thin film coil of each of said writing thin film magnetic heads is formed within each of said recessed portions;

the step of dividing the wafer into a plurality of bars, in each of which a plurality of combination type thin film magnetic head units are aligned in a longitudinal direction thereof;

the step of polishing a side surface of a bar to form air bearing surfaces of respective combination type thin film magnetic head units, while an amount of polishing is monitored by measuring a conduction/cut-off condition of said plurality of electrode elements of said electrode pattern; and the step of cutting said bar into a plurality of combination type thin film magnetic heads each including an air bearing surface which has been polished such that a desired throat height is obtained.

In the method of manufacturing the combination type thin film magnetic head according to the invention, the electrode elements of said electrode pattern are formed such that distances from said reference position of throat height zero to inner edges of the electrode elements differ from each other by a constant distance d. In this case, the plurality of electrode elements may be successively arranged in a stepwise manner or may be spread over a whole length of the bar. In the latter case, it is preferable that the electrodes elements are formed in scribe line regions provided between successive combination type thin film magnetic head units. Then, it is no more necessary to prepare special regions for the electrode pattern within the bar, and thus a larger number of combination type thin film magnetic heads can be manufactured from a single bar.

Furthermore, according to the invention, the electrode pattern is formed such that said distance d measured from the inner edges of a plurality of electrode elements to the reference position of throat height zero is preferably set to a value within a range of 0.1–0.5 µm. Then, the polishing can be performed such that the throat height having a very small value such as several microns to sub-microns can be can be controlled accurately.

According to the invention, it is preferable that the mask for forming the recessed portions and the electrode patterns are made of the same metal or metal compound selected from the group consisting of permalloy, copper, nickel, chromium and compounds of such metals such as nickel boron. Furthermore, the metal or metal compound layer may be advantageously formed by the plating process using a photoresist mask, and particularly it is preferable to form a permalloy layer by the plating process.

In the method of manufacturing a combination type thin film magnetic head according to the invention, it is preferable that after forming the combination type thin film magnetic head units such that the thin film coils of the writing thin film magnetic heads are formed within the recessed portions, the reading thin film magnetic heads are formed on the writing thin film magnetic head. In this case, after forming the writing thin film magnetic head units such that the thin film coils are wholly embedded within the recessed portions and the upper surfaces of the writing thin film magnetic heads are flattened, the reading thin film magnetic heads are preferably formed on the flattened surfaces.

By forming the reading thin film magnetic heads having the magnetoresistive layers after the formation of the writing thin film magnetic heads, the magnetoresistive layers are not subjected to the heating process, and therefore the characteristics of the magnetoresistive layers are not degraded. Then, it is possible to use the GMR element having a higher sensitivity than the AMR element, and the combination type thin film magnetic head having an improved surface recording density can be obtained.

In the method of manufacturing a combination type thin film magnetic head according to the invention, it is preferable to form the recessed portions in the surface of the wafer by the dry etching, especially reactive ion etching, while said metal or metal compound layer is used as a mask. By means of such etching, it is possible to form accurately the recessed portion having a depth not less than 5 μm and a side wall having a desired inclination angle. As explained above, the inclination angle of the side wall of the recessed portion defines the apex angle. It is preferable to form the recessed portion such that the inclination of its side wall is set to 45–75°, particularly 55–65°.

BRIEF DESCRIPTION OF THE DRAWINGS

FIGS. 1–10 are cross sectional views showing successive steps of a known method of manufacturing a combination type thin film magnetic head;

FIG. 16 is a plan view representing a relation between a thin film magnetic head unit and an electrode pattern;

FIGS. 17–33 are cross sectional views showing successive steps after the step of FIG. 15;

FIG. 36 is a plan view showing an electrode pattern used in another embodiment of the method of manufacturing a combination type thin film magnetic head according to the invention.

DESCRIPTION OF THE PREFERRED EMBODIMENTS

Figure 11:
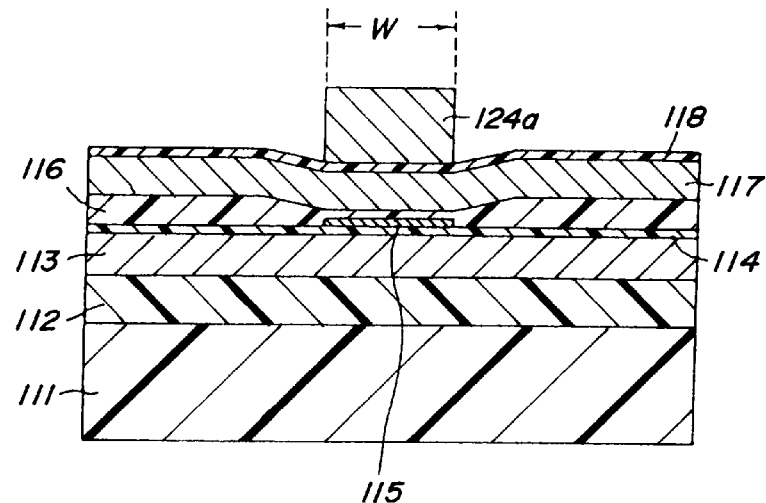
FIGS. 11 and 12 are front and plan views, respectively depicting the completed combination type thin film magnetic head by omitting an overcoat layer.
Figure 12:
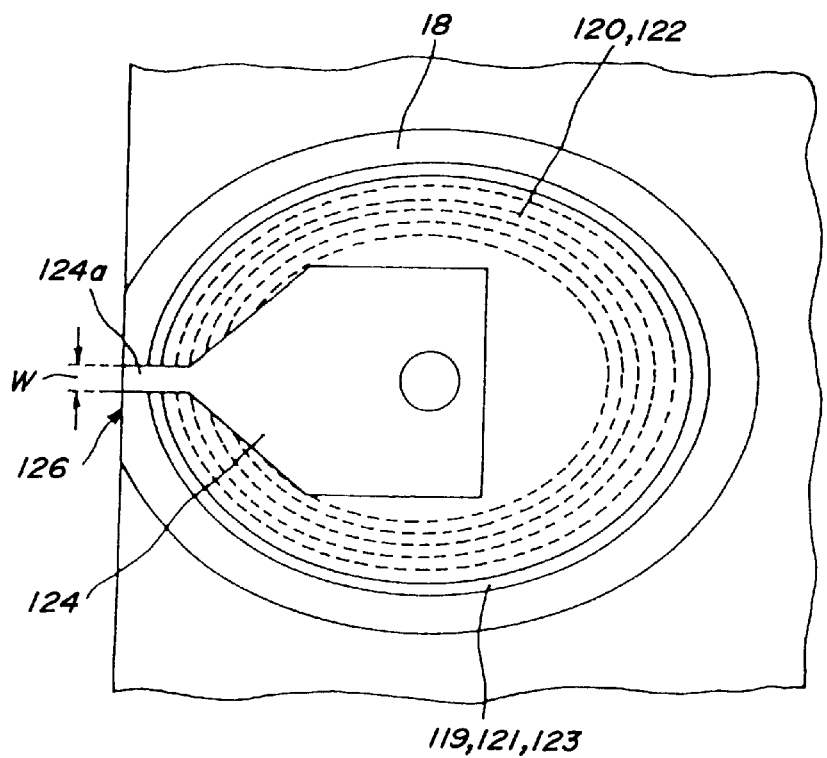

FIGS. 13–35 show successive steps of a first embodiment of the method of manufacturing a combination type thin film magnetic head according to the invention. In these drawings, sizes of various portions are exaggerated in order to emphasize the features of the present invention. Furthermore, substrates of simultaneously manufactured combination type thin film magnetic heads are formed by a wafer, and thus the substrate and wafer are denoted by the same reference numeral.

Figure 13:
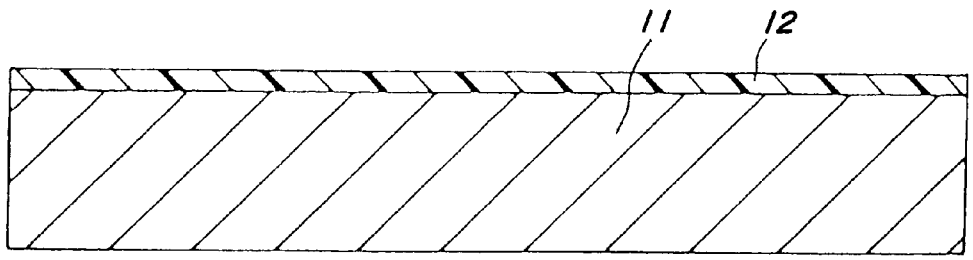
FIGS. 13–15 are cross sectional views illustrating successive steps of a first embodiment of the method of manufacturing a combination type thin film magnetic head according to this invention.

At first, as shown in FIG. 13, an insulating layer 12 made of alumina and having a thickness of about 0.3–0.5 μm is formed by sputtering on a whole surface of a substrate 11 made of AlTiC.

Figure 14:
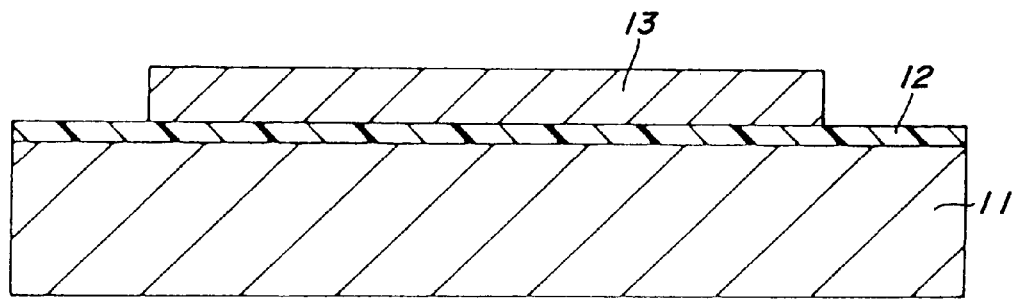

Next, as shown in FIG. 14, a photoresist layer 13 is selectively formed on the insulating layer 12, said photoresist layer defining a plan configuration of a recessed portions to be formed later.

Figure 15:
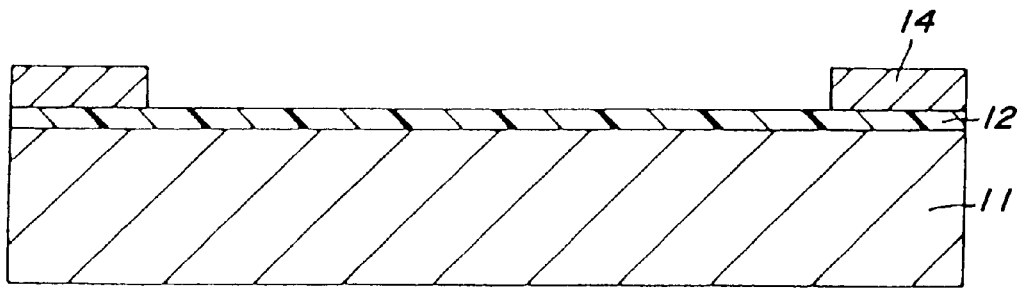

Then as depicted in FIG. 15, a metal or metal compound layer 14 made of, in the present embodiment permalloy is formed by plating while said photoresist layer 13 is used as a mask. After that, the photoresist layer 13 is removed.

Said metal or metal compound layer 14 may be made of a metal such as permalloy, copper, nickel, nickel boron or compounds of these metals. Since the metal or metal compound layer 14 is used as a mask for the formation of the recessed portions in the wafer surface, a thickness of this layer is preferably set to 3–4 μm such that a sufficiently large thickness is remained even after the etching. Further, the metal or metal compound layer may be formed by the sputtering instead of the plating.

According to the invention, upon forming the permalloy layer 14 serving as the mask for the formation of the recessed portion in the surface of the substrate 11, an electrode pattern is formed on the wafer.

FIG. 16 is a plan view showing a thin film magnetic head unit H having the permalloy layer 14 and an electrode pattern unit E including an electrode pattern P which is made of said permalloy. In an actual manufacturing process, a number of thin film magnetic heads are simultaneously formed in the wafer constituting the substrate 11, but FIG. 16 shows only a part of the wafer including a single thin film magnetic head unit H and a single electrode pattern unit E adjacent to the thin film magnetic head unit H. It should be noted that in the thin film magnetic head unit H, first magnetic layer 17, thin film coil 19, insulating layer 18 supporting the thin film coil in an isolated manner and second magnetic layer 22 to be formed later are shown by imaginary lines.

In the present embodiment, the electrode pattern P formed within the electrode pattern unit E simultaneously with the permalloy layer 14 includes a plurality of electrode elements 31a–31f which are arranged in a stepwise manner such that a distance from a reference position of throat height zero R to inner edges of the electrode elements is decreased by a constant length d successively. Both ends of respective electrode elements 31$^a$–31f are connected to contact pads 33a–33f by means of lead lines 32a–32f, respectively. These contact pads 33a–33f are connected to a measuring circuit for monitoring conduction/cut-off condition of the electrode elements 31a–31f during the polishing process.

In the present invention, in order to control an amount of polishing for the air bearing surface, the electrode pattern P is provided, and thus the electrode pattern should be formed with reference to the reference position of throat height zero R. In the embodiment illustrated in FIG. 16, among the electrode elements 31a–31f, an electrode element 31e which is closest to the positional reference R has an inner edge which is aligned with the reference position of throat height zero R. Furthermore, an inner edge of a middle electrode element 31c is aligned with the desired air bearing surface A.

According to the invention, the electrode pattern P and permalloy layer 14 are formed by the patterning using the same mask, and therefore they can be formed to have a precisely defined positional relationship. Furthermore, an edge of a recessed portion which will be formed later by using the permalloy layer 14 as a mask is coincided with the throat height zero position R. Since the position of the edge of the recessed portion is not shifted during the manufacturing process, the positional relationship between the throat height zero reference position R and the electrode pattern P is always precisely maintained during the manufacturing process.

Now successive manufacturing steps for the thin film magnetic head unit H after forming the permalloy layer 14 and electrode pattern P will be explained.

At first, as shown in FIG. 17, the reactive ion etching (RIE) is carried out using the permalloy layer 14 as a mask to form a recessed portion 15 in the surface of the substrate 21. The recessed portion 15 may be formed by the dry etching such as RIE and ion beam etching or wet etching, but in order to form the recessed portion having a depth not less than 5 μm with a precision in the order of 0.1 μm, it is preferable to use the reactive ion etching.

In the reactive ion etching, as an etching gas, a fluorine series gas such as $CF_4$ and $SF_6$, a chlorine series gas such as $BCl_3$ and $Cl_2$ or one of these gases diluted with $O_2$ or inert gas such as $N_2$, Ar and He may be used.

In the present embodiment, since the apex angle θ is determined by an inclination angle of the side wall of said recessed portion 15 which is near the air bearing surface, it is preferable to form the recessed portion such that the side wall of the recessed portion has the inclination angle of 45–70°, particularly 55–65° in accordance with the desired apex angle.

When the recessed portion 15 is formed by the dry etching as stated above, although the smoothness of the inner wall of the recessed portion is superior to that formed by other processes, there are formed sharp protrusions and depressions of about 0.1–0.5 μm. If such protrusions and depressions might cause undesired degradation in the insulating property of first magnetic layer and thin film coil of the thin film magnetic head to be formed within the recessed portion 15, the protrusions and depressions may be removed by the argon sputtering.

After forming the recessed portion 15 in the surface of the substrate 11 by the reactive ion etching in the manner explained above, the permalloy layer 14 serving as the mask during the etching is removed as illustrated in FIG. 18. It should be noted that during the removal of the permalloy layer 14, the insulating layer 12 serves as an etching stopper. In this case, the insulating layer 12 may be removed or may be remained.

Next, as shown in FIG. 19, an insulating layer 16 for isolating the substrate 11 and the writing thin film magnetic head from each other is formed on surfaces of the insulating layer 12 and inner wall of the recessed portion 15 by sputtering alumina with a thickness of about 1 μm. This insulating layer 16 also serves to embed the protrusions and depressions formed in the inner surface of the recessed portion 15 such that the degradation in isolation of the first magnetic layer and thin film coil of the inductive type thin film magnetic head formed within the recessed portion is avoided.

Next, as shown in FIG. 20, in order to form a bottom pole of the inductive type thin film magnetic head, a first magnetic layer 17 is formed on the alumina insulating layer 16 in accordance with a predetermined pattern. In the present embodiment, the first magnetic layer 17 is formed with a thickness of 3–4 μm by means of the plating process using a photoresist pattern. The pattern of the first magnetic layer 17 includes a pole portion having a narrow width defining a track width as illustrated in FIG. 16.

Subsequently as shown in FIG. 21, a multiple-layer thin film coil 19 is formed within the recessed portion 15 formed in the substrate surface such that coil windings of the thin film coil are electrically isolated by an insulating layer 18. During the formation of the thin film coil 19, the heating treatment is conducted at about 250° C., but since a configuration of the recessed portion 15 is not changed, the reference position of throat height zero and apex angle are not changed by such a heating treatment. Moreover, a top surface of the thin film coil 19 formed within the recessed portion 15 descends slightly and a space is formed above the recessed portion.

Next, as shown in FIG. 22, an alumina insulating layer 20 is formed with a thickness of 4–5 μm such that said space is filled with alumina. FIG. 23 is a cross sectional view showing the pole portion in this condition. As illustrated in FIG. 23, the insulating layer 20 is formed to cover the pole portion of the first magnetic layer 17. The insulating layer 20 may be made of silicon oxide or silicon nitride instead of alumina.

Next, the alumina insulating layer 20 is flattened by the chemical mechanical polishing (CMP) as depicted in FIGS. 24 and 25. Then, the surface of the first magnetic layer 17 formed on the surface of the substrate 11 except for the recessed portion 15 becomes coplanar with the surface of the insulating layer 20. In this case, although it is not always necessary to polish the surface of the first magnetic layer 17, it is preferable to polish the first magnetic layer slightly.

Then, as illustrated in FIG. 26, the exposed surface of the first magnetic layer 17 is etched-back by the ion beam etching. Furthermore, as depicted in FIGS. 27 and 28, a write gap layer 21 made of alumina is formed with a thickness of 150–300 nm, and then a second magnetic layer 22 made of permalloy is formed with a thickness of 3–4 μm by means of the plating process using a photoresist mask. The second magnetic layer 22 is magnetically coupled with the first magnetic layer 17 at a rear portion remote from the air bearing surface, and a part of the thin film coil 19 passes through a closed magnetic circuit formed by the first and second magnetic layers 17 and 22.

In the present embodiment, after etching-back the pole portion of the first magnetic layer 17, the write gap layer 21 and second magnetic layer 22 are formed, and therefore under the pole portion of the second magnetic layer 22 there is formed the trim structure protruding toward the first magnetic layer 17 in a self-alignment manner. Therefore, it is possible to obtain easily the thin film magnetic head in which a leakage of the magnetic flux can be suppressed and the higher surface recording density can be attained.

As illustrated in FIG. 29, a depressed portion formed in the surface of the second magnetic layer 22 for forming the trim structure is flattened by CMP.

Next, as shown in FIGS. 30 and 31, a shield gap layer 23 made of alumina is formed with a thickness of 100–200 nm, a MR layer 24 is formed on the shield gap layer, and then a shield gap layer 25 is formed thereon. The MR layer 24 is formed in a given pattern by means of the photolithography and etching technique. This etching has to be conducted precisely, and thus it is preferable to use the dry etching such as reactive ion etching.

Next, as depicted in FIGS. 32 and 33, a third magnetic layer 26 made of permalloy is formed on the shield gap layer 25 such that the MR reproducing element can be protected against an external magnetic field. Finally an overcoat layer 27 made of alumina is formed in order to protect the whole thin film magnetic head from en external mechanical impact.

Figure 34:
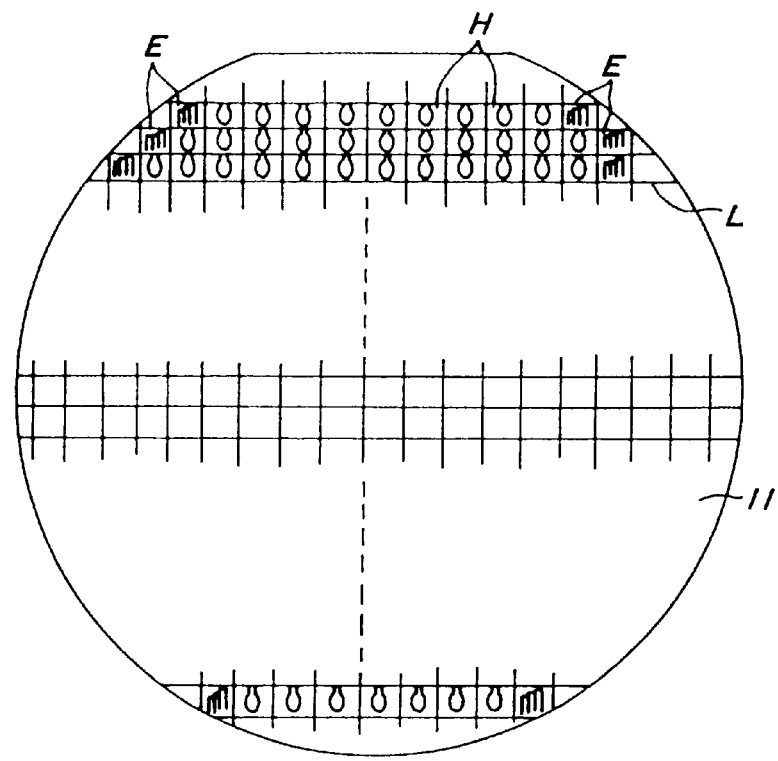
FIG. 34 is a plan view illustrating a wafer having a number of thin film magnetic head units formed therein.
Figure 35:
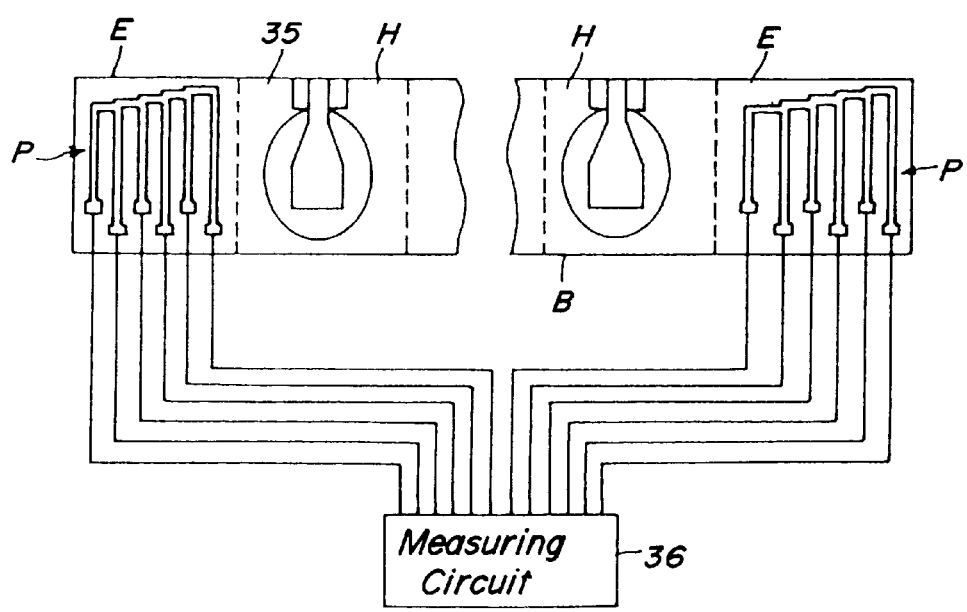
FIG. 35 is a plan view depicting a bar obtained by cutting the wafer.

FIG. 34 is a plan view showing the wafer 11 in which a number of combination type thin film magnetic head units H have formed in matrix. The wafer 11 is cut along scribe lines L to obtain bars B as shown in FIG. 35. Each bar B includes a number of thin film magnetic head units H are aligned in a longitudinal direction. In the present embodiment, as shown in FIG. 35, there are formed two electrode pattern units E each having an electrode pattern P and these two electrode pattern units are provided at or near respective ends of the bar B. For the sake of simplicity, the shield gap layers 23, 25, third magnetic layer 26 and overcoat layer 27 are omitted.

In the present invention, in case of polishing a side surface 35 of the bar B for forming the air bearing surface, the conduction/cut-off condition of the electrode elements 33a–33f of the electrode pattern P is measured. To this end, the contact pads 33a–33f connected to the both ends of the electrode elements 31a–31f, respectively are connected to a measuring circuit 36. It is sufficient that the measuring circuit 36 detects whether the electrode elements 31a–31f are electrically connected or not, and thus the measuring circuit can be simply constructed.

Furthermore, according to the invention, the electrode pattern P is made of the same material as that of the metal or metal compound layer 14 which has a smaller variation in resistance than the MR layer. Although a continuous change in resistance of the electrode elements 31a–31f may be measured to control an amount of the polishing, according to the basic conception of the present invention, the conduction/cut-off condition of the electrode elements 31a–31f of the electrode pattern P is measured, and therefore even if the resistance fluctuates for respective electrode elements, there is no problem.

Further, according to the invention, the electrode pattern P is formed simultaneously with the metal or metal compound layer 14, and the metal or metal compound layer defines the pattern of the recessed portion 15 and the pattern of the recessed portion does not deviate during the manufacturing process. Therefore, as shown in FIG. 16, the reference position of throat height zero R is not changed during the manufacturing process, and thus a positional relationship between the electrode elements 31a–31f of the electrode pattern P and the reference position of throat height zero R is maintained correctly during the manufacturing process. Therefore, by controlling a polishing amount by measuring the conduction/cut-off condition of the electrode elements 31a–31f, it is possible to obtain the throat height which is precisely identical with a desired design value.

Upon the progress of polishing the side surface 35 of the bar B, the electrode elements 31a–31f of the electrode pattern P are successively cut-off, and this condition can be accurately monitored by the measuring circuit 36. At first, when the electrode element 31a is cut-off, the electrical connection between the lead lines 32a and 32b is opened, and a resistance therebetween becomes infinite. In this case, the remaining electrode elements 31b–31f are remained conductive.

Upon further progress of polishing, when the electrode element 31b is cut-off, the connection between the lead lines 32b and 32c is opened and a resistance therebetween becomes infinite. In this manner, in accordance with the progress of polishing, the electrode elements are successively cut-off, and this cut-off condition can be monitored by the measuring circuit 36. In the present embodiment, since the electrode elements 31a–31f are formed such that their inner edges separate from each other by the constant distance d, it is possible to control a polishing amount with a pitch of this distance d. Therefore, if it is assumed that a desired throat height is equal to 2d, the polishing is stopped when the third electrode 31c is just cut-off. Then, the air bearing surface is formed just at this position.

As explained above, by conducting the polishing by monitoring the conduction/cut-off condition of the electrode elements 31a–31f of the electrode pattern P, it is possible to form the thin film magnetic head unit H having a desired throat height. In the present embodiment, as illustrated in FIG. 16, the MR layer 24 is formed such that its inner edge is coincided with the reference position of throat height zero R, and therefore the throat height and MR height become identical with each other. Therefore, not only the throat height, but also the MR height can be formed to have a desired value.

In this manner, it is possible to obtain the bar B in which a number of thin film magnetic head units H having desired throat height and MR height are aligned. Then, the bar B is divided into respective combination type thin film magnetic heads. In this case, portions of the wafer at which the electrode patterns P are formed are wasted, it is preferable to decrease the number of the electrode patterns P within a single bar B. However, if only one electrode pattern is provided in a single bar B, an inclination of the polished surface could not be monitored accurately and the air bearing surface could not be formed correctly. Therefore, it is preferable to provide the two electrode patterns P at or near both ends of the bar B.

FIG. 36 shows another embodiment of the electrode pattern P according to the invention. In the above embodiment, a plurality of electrode elements 31a–31f of the electrode pattern P are formed as an integral body, but in the present embodiment, an electrode element 51, lead lines 52 connected to both ends of the electrode element and contact pads 53 connected to the lead lines are formed as a unit and a plurality of such units are arranged in a dispersed manner along a longitudinal direction of the bar B. That is to say, a plurality of electrode elements 51 are formed in scribed line regions L formed between adjacent thin film magnetic head units H in a dispersed manner. The scribe line regions L are inherently required for dividing the bar into respective thin film magnetic heads, and therefore it is no more necessary to provide special regions for the electrode pattern P, that is the electrode pattern units E in the bar B. In this manner, the utilization efficiency of the bar can be increased and the manufacturing cost can be decreased.

In the method of manufacturing a combination type thin film magnetic head according to the invention, an amount of polishing the air bearing surface A can be detected by monitoring the conduction/cut-off condition of the electrode elements of the electrode pattern P formed in the bar B. Thus, a control signal is supplied from the measuring circuit 36 to a polishing machine such that the polishing is stopped when a predetermined electrode element is cut-off. In this case, an overrun of the polishing machine may be taken in consideration, and a driving speed of the polishing machine may be gradually decreased when an actual time comes closer to an estimated timing at which the predetermined electrode element will be cut-off. For this purpose, a variation in resistance of the electrode elements may be monitored by the measuring circuit 36, and when an abrupt change in resistance is detected, it may be the cut-off the electrode element will occur soon. Although the resistance of the electrode elements fluctuates, such an abrupt change in resistance can be detected rather accurately. Therefore, according to the invention, the fluctuation of resistance does not cause any problem, because the polishing is stopped on the basis of the conduction/cut-off condition of the electrode elements.

The present invention is not limited to the above embodiments and many alternations and modifications may be conceived within the scope of the invention. For example, in the above embodiments, the electrode pattern P is formed such that the inner edge of electrode element 31e is coincided with the reference position of throat height zero R. However, according to the invention, this is not always necessary. For instance, the inner edge of the electrode element 31e may be shifted toward the air bearing surface A with respect to the throat height zero position R. Furthermore, it is not always necessary to form the successive electrode elements to be separated by the same distance. For instance, a distance between electrode elements near the air bearing surface may be smaller than that between electrode elements remote from the air bearing surface.

In the above embodiments, the thin film coil of the writing inductive type thin film magnetic head is formed to be completely embedded within the recessed portion and the surface of the thin film coil is made coplanar with the surface of the first magnetic layer. However, a part of the thin film coil may be protruded from the recessed portion.

Moreover, in the above embodiment, the combination type thin film magnetic head is constructed as the so-called reverse type, in which the magnetoresistive type reading thin film magnetic head is stacked on the inductive type writing thin film magnetic head. But, according to the invention, the magnetoresistive type reading thin film magnetic head may be formed under the inductive type writing thin film magnetic head.

As explained above in detail, in the method of manufacturing a combination type thin film magnetic head according to the invention, since the electrode pattern for monitoring an amount of polishing the air bearing surface is formed simultaneously with the metal or metal layer which serves as a mask for forming the recessed portion in the surface of the substrate, any special step of forming the electrode pattern and an increase in manufacturing cost can be suppressed. The edge of the recessed portion constituting the throat height zero reference position is not shifted during the manufacturing process, and therefore the desired throat height can be accurately obtained by polishing the air bearing surface with reference to the throat height zero position.

An amount of polishing is monitored not by measuring a change in resistance of the electrode elements, but by the conduction/cut-off condition of the electrode elements, and thus even if the metal or metal compound layer includes a fluctuation in resistance, the accurate control for the polishing amount can be performed without being influenced by the fluctuation in resistance. Therefore, it is possible to manufacture the combination type thin film magnetic head having the desired throat height and MR height.

As explained above, when the electrode elements of the electrode pattern are arranged in the scribe lines between the thin film magnetic head units in a dispersed manner, the utilization efficiency of the bar can be increased and an increase in manufacturing cost can be suppressed.

Moreover, according to the invention, by forming the thin film coil of the inductive type writing thin film magnetic head is formed within the recessed portion formed in the surface of the substrate, the apex angle can be determined accurately by the inclination angle of the side wall of the recessed portion, said inclination angle being not shifted during the manufacturing process. Furthermore, when after forming the inductive type thin film magnetic head, the reproducing MR thin film magnetic head is formed on the inductive type head, the MR element is not subjected to undesired heating treatment, and therefore the characteristics of the MR element are not degraded. Particularly, since the GMR element which is liable to be affected by heating can be utilized, it is possible to realize the higher surface recording density.

I claim:

1. A method of manufacturing a combination thin film magnetic head in which an inductive type writing thin film magnetic head and a magnetoresistive type reading thin film magnetic head are stacked on a surface of a substrate in a magnetically and electrically isolating manner comprising:

the step of forming recessed portions in a surface of a wafer constituting the substrate by using a mask made of a metal or metal compound, and at the same time forming one or more electrode patterns each including a plurality of electrode elements made of said metal or metal compound such that distances from a reference position of throat height zero to inner edges of respective electrode elements differ from each other, said reference position extending in a direction parallel with air bearing surfaces of combination thin film magnetic head units and being coincided with edges of the recessed portions;

the step of forming a first insulating layer on the surface of the wafer including inner surfaces of the recessed portions;

the step of forming combination thin film magnetic head units each including a writing thin film magnetic head and a reading thin film magnetic head on the wafer such that at least a part of a thin film coil of each of said writing thin film magnetic heads is formed within each of said recessed portions;

the step of dividing the wafer into a plurality of bars, in each of which a plurality of combination thin film magnetic head units are aligned in a longitudinal direction thereof;

the step of polishing a side surface of a bar to form air bearing surfaces of respective combination thin film magnetic head units, while an amount of polishing is monitored by measuring a conduction/cut-off condition of said plurality of electrode elements of said electrode pattern; and the step of cutting said bar into a plurality of combination thin film magnetic heads each including an air bearing surface which has been polished such that a desired throat height is obtained.

2. A method according to claim 1, wherein said plurality of electrode elements of the electrode pattern are formed such that distances from said reference position of throat height zero to the inner edges of respective electrode elements differs from each other by a constant distance d.

3. A method according to claim 1, wherein said plurality of electrode elements of the electrode pattern are formed such that a distance d from said reference position of throat height zero to the inner edges of respective electrode elements is gradually increased apart from a middle electrode element.

4. A method according to claim 2, wherein said distance d is set to a value within a range of 0.1–0.5 μm.

5. A method according to claim 4, wherein said plurality of electrode elements of the electrode pattern are formed such that an inner edge of a middle electrode element is coincided with a desired position of the air bearing surface.

6. A method according to claim 5, wherein said plurality of electrode elements of the electrode pattern are formed such that an inner edge of the innermost electrode element is coincided with the reference position of throat height zero.

7. A method according to claim 2, wherein said plurality of electrode elements of the electrode pattern are successively arranged in a stepwise manner.

8. A method according to claim 1, wherein two sets of electrode patterns are formed at or near both ends of said bar.

9. A method according to claim 1, wherein said plurality of electrode elements of the electrode pattern are formed over a whole length of the bar in a dispersed manner.

10. A method according to claim 9, wherein said plurality of electrode elements of the electrode patter are provided in scribe line regions between successive combination thin film magnetic head units.

11. A method according to claim 1, wherein said mask for forming the recessed portions and the electrode pattern are made of a metal or metal compound selected from the group consisting of permalloy, copper, nickel, chromium, and compounds of said metals.

12. A method according to claim 11, wherein said metal or metal compound layer is formed by a plating process using a mask made of photoresist.

13. A method according to claim 12, wherein said metal or metal compound layer is made of a permalloy.

14. A method according to claim 1, wherein after forming the combination thin film magnetic head units such that at least parts of the thin film coils of the writing thin film magnetic heads within the recessed portions, the reading thin film magnetic heads are formed on the writing thin film magnetic heads.

15. A method according to claim 14, wherein after forming the combination thin film magnetic head units such that the thin film coils of the writing thin film magnetic heads completely within the recessed portions to obtain a flat surface, the reading thin film magnetic heads are formed on the thus flattened surface.

16. A method according to claim 14, wherein said reading thin film magnetic head is formed by an anisotropic magnetoresistive layer.

17. A method according to claim 14, wherein said reading thin film magnetic head is formed by a giant magnetoresistive layer.

18. A method according to claim 1, wherein said recessed portions are formed by a dry etching process using said metal or metal compound layer as a mask.

19. A method according to claim 18, wherein said dry etching process is a reactive ion etching.

20. A method according to claim 18, wherein said recessed portions are formed such that an inclination angle of a side wall of a recessed portion is set to 45–75°.

21. A method according to claim 20, wherein said recessed portions are formed such that an inclination angle of a side wall of a recessed portion is set to 55–65°.

22. A method according to claim 1, wherein said recessed portions are formed to have a depth not less than 5 µm.

23. A method according to claim 1, wherein a driving speed of a polishing machine for polishing said air bearing surface is gradually decreased when an actual time comes closer to an estimated time at which a predetermined electrode element will be cut-off.

* * * * *